United States Patent Office 3,730,782
Patented May 1, 1973

3,730,782
NON-ACTIVATED SOLDERING FLUX
Richard M. Poliak, Johnson City, and Leslie D. Rauch, Binghamton, N.Y., assignors to International Business Machines Corporation, Armonk, N.Y.
No Drawing. Filed July 27, 1970, Ser. No. 58,644
Int. Cl. C23c 1/12
U.S. Cl. 148—23                    27 Claims

ABSTRACT OF THE DISCLOSURE

A non-activated soldering flux comprising from 20–65% rosin, 0.01–1% of a cationic fluorocarbon surfactant, balance organic solvents. The flux finds particular application in the field of microelectronics.

A process for using the above soldering flux comprises assembling two members to be joined, preferably metallic members, in contiguous relationship, applying the above flux thereto and then soldering the members together.

A process for forming a flux as described is also provided.

BACKGROUND OF THE INVENTION

Field of the invention

The present invention relates to soldering fluxes, more particularly non-corrosive cationic fluorocarbon surfactant containing fluxes, to processes for using the same, and to processes for forming the same.

Description of the prior art

Many different types of soldering fluxes are known to the prior art. However, for various reasons, few of the prior art soldering fluxes can be used in the field of microelectronics, because of the exacting requirements encountered in this area.

For instance, it is generally required that a solder flux have a good heat distribution characteristic, which permits fast, uniform flow of the soldering flux.

Further, a soldering flux used in the area of microelectronics must result in no gummy or tacky residue, since such a residue will often penetrate under leads and remain conductive.

A soldering flux used in the area of microelectronics should contain no corrosive components, since corrosion can ruin electrical devices.

To meet the above requirements, many soldering fluxes used by the prior art are based upon rosin as an essential ingredient. Rosin is non-conductive and generally non-corrosive. This is due to the physical nature of rosin, that is, it hardens after soldering, not to any chemical inertness of rosin. However, rosin has several faults. Firstly, rosin has a tendency to decompose or polymerize when subjected to the thermal cycles of preheating and the soldering operation. The rosin residue remaining after soldering will harden and char, thereby becoming extremely difficult to remove, depending upon the time and temperature required to solder the parts and the length of time elapsed between soldering and cleaning.

The end result of utilizing a rosin-based flux is that the rosin flux residue continues to harden after soldering, and, as time progresses, becomes less soluble in common cleaning solvents. Typically, this lowered solubility of the rosin flux residue results in the need for lengthy and vigorous cleaning.

One course which the prior art has utilized to remove patrially hardened rosin is to use ultrasonic agitation. While this does result in a removal of the polymerized or charred rosin residue, many transistors are adversely affected by ultrasonic agitation, and thus cannot be assembled in a fabrication scheme involving ultrasonic agitation, but must be assembled in a separate fabrication step.

Other electrical components are also affected by exposure to flux residue cleaning solvents. For instance, printed circuit coatings are softened by the common flux solvents when these solvents are used under conditions sufficient to remove a charred rosin residue.

To attempt to overcome the above problems, the prior art has been forced to use very mild soldering conditions or else to remove flux residue immediately after soldering, two restrictions which hamper the efficiency of modern soldering processes.

Though subject to faults, because of the disadvantages recited, rosin-based fluxes are known to the prior art.

U.S. Pat. 3,003,901, Marcel discloses a non-corrosive soldering flux which comprises rosin, isopropyl alcohol, glycerin, and camphor. Such a soldering flux is subject to two inherent faults. First, camphor boils at 400° F., and it would be impossible to use such a flux at higher temperatures. Secondly, champhor, as recognized by the art, can be toxic to humans.

U.S. Pat. 2,805,970, McBride discloses a soldering flux which contains a water displacing, oil-soluble, surface active agent, such as Alox 937. The surface active agents described in the McBride patent are typically heterogeneous mixtures of calcium soaps of high molecular weight organic acids containing small amounts of a surface active agent comprising sulfonated long chain aliphatic alcohols. Obviously, a soap of an acid could lead to corrosion resulting from the use of such a soldering flux. Large quantities of the water displacing, oil-soluble, surface active agent are required in the McBride flux.

U.S. Pat. 3,323,204, Gockel discloses a novel flux composition which can be used to manufacture multiple glass units. The basic fluxing ingredient of this patent is zinc chloride. This is an inorganic activator, and the flux of Gockel would be extremely corrosive. Further, such a flux would be highly conductive and thereby totally unsuited for electrical applications. Gockel can broadly be taken as representing a type of flux which would find little or no usage in the microelectronic industry.

SUMMARY OF THE INVENTION

The present invention provides a novel, non-activated, non-corrosive rosin flux which overcomes all of the disadvantages of the prior art recited above.

The flux basically comprises 30–40% water white rosin, 60–70% organic solvents and 0.01–1.0% of a cationic fluorocarbon surfactant. In a preferred embodiment, about 2–3% glycerine is also present. A process for using the flux of this invention and a process for forming the same are also provided.

The use of such a flux enables substantial benefits to be achieved and, while not limited thereto, the main benefits are encountered in the electronic environment, most preferably in the microelectronic environment. These benefits are due primarily to the use of a cationic fluorinated surfactant in the rosin flux of the present invention.

First, the non-activated rosin flux of the present invention is both non-corrosive and non-conductive. Both requirements are necessary in the field of microelectronics.

Secondly, the non-activated rosin flux of the present invention exhibits improved heat distribution characteristics. This results in a faster and more uniform solder flow with a lessened tendency to bridge.

Thirdly, the rosin flux of the present invention results in no gummy residue after use, and the resulting residue does not penetrate under leads which are typically soldered in microelectronic devices.

Fourthly, in a preferred embodiment, the present invention provides a flux wherein residue removal after soldering is no problem, even though the soldered parts may be exposed to longer soldering times and delayed cleaning. This is primarily due to the glycerine component which will deter polymerization and thereby eliminate charred residue. Due to the ease of removal of the residue that does result, the use of ultrasonic or vigorous agitation is no longer required. This insures against damage to sensitive components during cleaning, and thereby permits cleaning of an entire device, even with transistors sensitive to ultrasonic agitation, in a single unified fabrication process.

A fifth advantage of the flux of the present invention is encountered in soldering processes where flux removal is not possible. The residue resulting from the flux of the present invention is so non-corrosive that the residue can be left on the soldered part without cleaning. Chemical and corrosion analysis have shown no harmful effects when the flux residue is permitted to remain in place.

A sixth advantage of the flux of the present invention is that it provides improved wetting and oxide removal, i.e., improved fluxing ability over prior art fluxes. The flux of this invention can be utilized to replace both activated fluxes (in processes where the prior art required such for their cleaning ability) or non-activated rosin fluxes (which, though less corrosive, exhibited insufficient cleaning ability).

Finally, the non-activated soldering flux of this invention can be easily removed with common solvents, such as trichloroethylene and, as the flux remains soft and soluble after soldering, it is possible to delay flux removal until all soldering operations have been completed.

Many of the unique advantages of the rosin flux of the present invention are provided by the use of the cationic fluorocarbon surfactant therein.

The cationic fluorocarbon surfactant of the present invention basically consists of a fluorocarbon chain or "tail," which is both hydrophobic and oleophilic, and a solubilizing group which lends a cationic character to the fluorocarbon chain.

In the fluorocarbon chain of the present invention, which can be cyclic or non-cyclic, it is necessary that the hydrogens on the carbon structure be replaced by fluorine to such a degree that the fluorocarbon chain or hydrophobic portion of the liquid surfactant be essentially a fluorocarbon. This does not imply complete hydrogen replacement in all instances, though such will, for ease of commercial availability, generally be the case.

The surfactant of the present invention contains the recurring unit ($CF_2$), and can generally be represented by the formula:

$$YCF_2(CF_2)_p—X$$

wherein X is a solubilizing group, as defined below, Y is a moiety required to complete the fluorocarbon chain such as H or F, and $p$ is a positive integer.

The solubilizing group is a group which will have a cationic character, i.e., the solubilizing group will always carry a positive charge and impart such a charge to the fluorocarbon chain or "tail."

Preferred cationic fluorocarbon surfactants are set forth in detail at a later portion of the specification.

It is thus one object of the present invention to provide a non-activated, non-conductive, non-corrosive soldering flux containing a cationic fluorocarbon surface active agent.

It is a further object of the present invention to provide a non-activated soldering flux as above which has excellent heat distribution characteristics.

It is yet another object of the present invention to provide a non-activated soldering flux as above which does not rapidly polymerize after use, and which can thereby be easily worked for long periods of time and yet still be easily removed from the work surfaces by means of a solvent.

It is still a further object of this invention to provide an improved soldering process.

Another object of this invention is to provide a process for forming the soldering flux of this invention where the flux illustrates an improved fluxing capability.

These and other objects of the present invention will be more fully appreciated by reference to the following description.

DETAILED DESCRIPTION OF THE PREFERRED EMBODIMENTS

The present invention provides a novel non-activated rosin flux illustrating superior properties over the rosin fluxes of the prior art.

In the context of the present invention, the term "non-activated" implies that the flux is no more corrosive nor conductive than the rosin residue alone. Typically, non-activated fluxes are used in the soldering of a read-write lead assembly. Solder iron temperatures of 450–600 F. are used with no cleaning.

A further use for the non-activated fluxes is in the formation of multilayer electronic board assemblies where the complete removal of flux residue is not possible. In this type of operation oven soldering is used, and the portions which can be cleaned are cleaned in a Freon-isopropyl alcohol cleaning solution.

Yet another area wherein non-activated fluxes find special application is in organic chip soldering, where complete residue removal is desirable and reliability is a primary factor. Hot knife soldering is used with cleaning in an azeotrope of an aliphatic alcohol and Chlorothene. Non-activated rosin fluxes illustrate somewhat less desirable characteristics in soldering on nickel plate or beryllium copper, Kovar and 90/10 tin/lead.

In broadest terms, the non-activated flux of the present invention comprises:

(1) liquid form:
   20–65% rosin
   0.01–1% cationic fluorocarbon surfactant(s)
   balance organic solvent(s)
(2) paste form:
   99–99.99% rosin
   0.01–1% cationic fluorocarbon surfactant(s)
(3) protective coating form:
   10–20% rosin
   0.01–1% cationic fluorocarbon surfactants
   balance organic solvent(s)
(4) preferred liquid form (polymerization inhibited) Formula (1) plus 2–3% glycerine.

A more preferred flux of the present invention is a liquid flux and consists of:

30–40% water white rosin;
60–70% of a $C_1$ to $C_3$ primary alcohol organic solvent;
0.01–1.0% of a cationic fluorocarbon surfactant; and
2–3% of glycerin (optional for operability; highly preferred for electronic soldering).

All percentages, unless otherwise indicated, are by weight.

A specific and most preferred composition of the soldering flux of the present invention comprises the following materials:

| | Percent |
|---|---|
| Isopropyl alcohol | 60–70 |
| Water white rosin | 30–40 |
| Glycerin (optional) | 2–3 |
| Cationic fluorocarbon surfactant | 0.01–1.0 |

Water white rosin is a well known material. Chemically water white rosin is a mixture of several compounds. While the specific composition of the individual rosin utilized will vary depending upon the raw material source, white water rosin can generally be typified as a mixture of isomeric diterpene acids. The three major components are abientic acid, D-pimaric acid and L-pimaric acid. An "average" rosin will comprise up to 80–90% abietic acid, with the pimaric acids comprising 10–15%. The designation "water white rosin" refers to a grade of rosin determined by colorimetric methods (see ASTM Designation D509-55). The properties of water white rosin are well described in the text Solders and Soldering, published by McGraw-Hill and authored by H. Manko. Representative suppliers of water white rosin are Filtered Rosin Products (N, WG and WW Gum Rosin) and the Taylor-Lowenstein Co. (N, WG and WW Gum Rosin).

In addition to water white rosin, other materials can be used, but water white rosin was found to be superior to other rosins which are operable, for instance, hydrogenated wood rosin and polymerized-dimerized rosin. Although water white rosin was found to be superior to other rosins, if other rosins are substituted therefor, the resulting flux was superior to commercial non-activated rosin fluxes no matter what type of rosin was utilized.

Some types of rosin should be avoided in the preparation of the flux of the present invention. For instance, rosins or resins which are incompatible with the other flux components, i.e., the organic solvents or cationic fluorocarbon surfactant, should be avoided. Rosins or resins which are incompatible with cleaning solvents or which are toxic to humans should also be avoided. A rosin which would be unstable at the fluxing temperatures encountered, should, of course, be avoided. Rosins of the above type will be obvious to one skilled in the art.

Unlike prior art non-activated rosin fluxes, the rosin flux of the present invention shows an excellent fluxing ability at temperatures as high as 600° F., and also has a very wide fluxing range, 375-600° F. It is theorized that the addition of glycerine and the cationic fluorocarbon surfactant extend the useful soldering range of the water white rosin, and allow a much wider usage than that encountered with prior art non-activated rosins. For instance, a prior art rosin flux might have an acceptable fluxing action at temperatures of from 450-550° F., falling off very rapidly in activity at 560° F. In fact, the prior art considered the use of water white rosin alone to lead to several faults in soldering processes, primarily that overheating water white rosin caused it to turn dark and lose most of its tarnish removing ability. Water white rosin was also viewed as generally having a rather poor fluxing ability.

It is most preferred to use from 30-40% of the water white rosin in the liquid rosin flux formulation of the present invention. From 30-40% of water white rosin, or its equivalent, has been found to meet two primary requirements of the soldering operation: (1) it provides a sufficient rosin film thickness during soldering to prevent oxide formation on the surfaces being joined during solder liquid flow; and (2) this amount of water white rosin will promote solder spreading, i.e. wetting. The main function of the rosin flux is, of course, to remove oxides by reducing the same during soldering and to clean the surfaces of the parts being joined during soldering so that a superior solder bond may be formed.

Operable limits for the liquid flux are, however, from 20% to 65% of the water white rosin. At amounts greater than 65%, approximately 65-80%, the solder flux starts to become non-liquid and can only be used as a plaste flux. However, even a paste flux at these elevated water white rosin concentrations provides good soldering results with respect to solder flow and tinning. At amounts of water white rosin less than 20% the rosin flux formulation of the present invention begins to have a viscosity insufficient to meet the two requirements filled by the 30-40% range. However, under 20% of water white rosin will still provide a formulation which can be used as a protective coating. The preferred range for a protective coating would be 10- approximately 20% water white rosin, with alcohols or ethyl acetate serving as the solvent component. The cationic fluorocarbon surfactant range should be 0.01-1.0%.

The second main component of the non-activated rosin flux of the present invention is an organic solvent or solvent mixture. The most preferred organic solvent is isopropyl alcohol. The purpose of the isopropyl alcohol is to dissolve the rosin and cationic fluorocarbon surfactant, and to keep the flux components in a clear, homogeneous liquid state. Any primary alcohols (or mixtures thereof) containing up to three carbon atoms can be used as the solvent, with illustrative primary alcohols being methyl, ethyl, isopropyl and n-propyl alcohols. While operability can be obtained with 4 carbon atom primary alcohols, i.e., n-butanol or isobutanol, the cationic fluorocarbon surfactant will be only partially soluble therein and inferior results are obtained, while in alcohols of 5 carbon atoms or higher the fluorocarbon surfactant cannot be dissolved.

While $C_1-C_3$ primary alcohols are preferred and isopropyl alcohol is the most preferred solvent, materials which can be substituted for the primary alcohols must also be completely soluble in solvents such as the Chlorothenes or Freon solvents, must be compatible (or soluble) with the other components in the flux formulation, must illustrate minimal decomposition products after soldering and must have a uniform rate of evaporation to insure against flux sputtering during soldering. If the above criteria are met, other solvents can be used. For instance, solvents other than those recited that are useful in the flux of the present invention include:

|  | Boiling point, ° C. |
|---|---|
| Acetone $CH_3COCH_3$ | 56.5 |
| 2-ethoxyethanol $C_2H_5OCH_2CH_2OH$ | 135 |

Both of these compounds are soluble with the other flux components as well as Freon solvents and/or chlorothene. Other equivalent solvents which meet the above criteria can easily be determined by one skilled in the art in light of the information provided by this application.

Operable embodiments can be obtained by using mixtures of $C_1-C_3$ alcohols (70-90%) with $C_4-C_5$ alcohols (30-10%). A greater percentage (90%) of a $C_3$ alcohol is required to insure solubility of the cationic surfactant. The order of the surfactant solubility is $C_1 > C_2 > C_3$ in alcohols. Examples of preferred $C_4$ and $C_5$ alcohol solvents include:

|  | Boiling points, ° F. | Flash points, ° F. |
|---|---|---|
| 1-butanol | 117 | 115 |
| 2-butanol | 99.5 | 85 |
| Isobutyl alcohol | 108.4 |  |
| 1-pentanol | 136 | 136 |
| 2-pentanol | 119.3 | 70 |

All of the $C_4-C_5$ examples are soluble in chlorothene and/or Freon solvents. The above mixtures would also preferably comprise 60-70% of the liquid flux of the present invention.

It is preferred to utilize 60-70% of the solvent, such as isopropanol, because within this range a liquid flux which is homogeneous and free of component separation regardless of solvent evaporation can be obtained. If a paste form of the flux is desired, then as low as 30-40% of the solvent serves as a preferred range.

If a powdered form of the flux is required, no solvent would be required, and the water white rosin would merely be mixed with 0.01-1.0% of the cationic fluorocarbon. The flux powder can be poured over a solder preform to be reflowed.

A third component in the most preferred embodiment of the flux of the present invention is glycerine, used in an amount of 2-3%.

Glycerine is an optional component of the flux of this invention. However, as the following discussion makes clear, the addition of glycerine is highly preferred.

Glycerine serves as a polymerization inhibitor in the most preferred embodiment of the flux of the present invention, and retards decomposition or charring of the flux.

The function of glycerine as a polymerization inhibitor is quite similar to that of known polymerization inhibitors such as hydroquinone, which inhibit polymerization due to the presence of oxygen. Glycerine (glycerol) is non-toxic to humans, can be easily handled and contains properties characteristic of the alcohol family, in view of the $CH_2OHCHOHCH_2OH$ formula of glycerol.

It is most preferred that, when used, the amount of glycerine (hereinafter the term will be used interchangeably with glycerol) be maintained within the range of from about 2% to about 3%. This is because with amounts of glycerine much greater than 3% some gummy residue will result. At amounts of glycerine much under 2%, the effectiveness of the glycerol is diminished. However, it will be appreciated that variation from the 2–3% range is permissible depending upon the exact amount of residue which is permissible, and the effectiveness required. For microelectronic application, where substantially no residue is most desirable, the flux functions best in the 2–3% glycerol range.

In addition to the above, basic constituents of the non-activated rosin flux of the present invention, minor amounts of other materials can be present. For instance, alcohols other than recited can be present with the $C_1$–$C_3$ organic solvents, generally in an amount less than 14% of the total composition. This is useful if a secondary solvent is desired for a particular type of fluxing application. For instance, ethylene glycol could be used. Other glycols, while operable, are not recommendable in the present flux due to the fact that they lead to gummy residues or are non-compatible with the total formula.

Forming the basis for the primary advantages of the present invention, the final essential component of the non-activated rosin flux comprises a cationic fluorocarbon surfactant, a specific instance of which is FC–134, available from the 3M Corporation. In the following discussion the terms "fluorocarbon" and "fluorochemical" will be used interchangeably.

A fluorinated or fluorochemical surfactant, as the term is used in the present invention, is an organic cationic surfactant that contains the element fluorine and a solubilizing group in its structure. The term "solubilizing group" is used to denote any moiety which will provide the surfactant with oil and/or water solubility, and cationic characteristics.

The following material describes cationic fluorocarbon surfactants useful in the present invention in greater detail.

Cationic fluorocarbons as used in this invention can be defined as compounds of carbon and fluorine with or without hydrogen, i.e., analogs of hydrocarbons in which all or nearly all the hydrogen has been replaced by fluorine. More specifically, the presence of two or more fluorine atoms on a carbon atom impart increased stability and inertness to that compound. The cationic fluorocarbons are characterized by extreme chemical inertness, do not burn, and are thermally stable to 500° F. or more.

The fluorocarbons used in this invention are known to the art, and no novelty is claimed for the fluorocarbons per se. The fluorocarbons used in this invention can be prepared by processes available to the prior art, for instance:

(a) By the electrolysis of solutions in hydrogen fluoride (Simons Process) described in U.S. Patent 2,519,983;

(b) By the replacement of chlorine or bromine by fluorine, i.e., with hydrogen fluoride in the presence of a catalyst such as antimony triphosphate or pentafluoride;

(c) By the addition of hydrogen fluoride to olefines or acetylene;

(d) By the reaction of alkanephosphoric acid chloride with a diamine or polyamine to produce at least one free amino group in the product, for instance, as described in U.S. Patents 2,655,533 and 2,648,706 Lewis et al.;

(e) By the permanganate oxidation of a polyfluoroalkanol which is the reaction product of methanol and a fully halogenated polyfluoroalkanol having the formula $$H(CX_2CX_2)_nCH_2OH,$$

where $x$ is a halogen of atomic weight below 40, at least half of the $x$'s in each $CX_2CX_2$ group are fluorine and $n$ is an integer from 3 to 10, inclusive. For instance, see U.S. Patent 2,559,629 Berry.

Literature on the preparation of fluorocarbons is quite extensive. One typical method which utilizes a reaction tube and insures good yields is described below.

Fluorine is diluted with nitrogen, then reacted slowly with hydrocarbon vapors within meshes of a copper screen plated with silver. Temperatures in the reaction tube range from 140–325° C.

$AgF_2$ is the active agent from fluorinating (replacing hydrogen) the organic material, allowing elemental fluorine to renew an active coating on the metallic surface. By this process n-heptane, for example, is reacted to yield 62% of $C_7F_{16}$.

Cationic fluorochemical surfactants as used herein have the unique property of being surface active in organic liquids as well as aqueous solutions. They represent the most stable and surface active of all known surfactants. These surfactants have the ability to adsorb too many surfaces from solution and provide corrosion and stain resistance.

The use level for cationic fluorochemical surfactants is very low, and they can thus provide surfactant properties without adverse side effects normally associated with the use levels of ordinary surfactants.

The cationic fluorocarbon surfactants of the present invention contain the recurring unit $(CF_2)$, and can generally be represented by the formula:

$$YCF_2)_p—X$$

wherein X is a solubilizing group, as defined below, Y is a moiety required to complete the fluorocarbon chain such as H or F, and $p$ is a positive integer.

The solubilizing portion consists of any group which will have a cationic character. The term "cationic character" refers to the positive charge carried by the solubilizing group. The cationic fluorocarbon surfactants used in this invention can thus be viewed as a molecule, one end of which is a solubilizing functional group, while the other end consists of a fluorocarbon group containing a minimum of four carbon atoms.

Any cationic fluorocarbon surfactant which meets the above qualifications can be used with varying degrees of success in the present invention. The following material deals with representative and preferred materials useful in the present invention which have been found to yield superior results.

Generally, representative preferred cationic fluorocarbon surfactants comprise quaternary ammonium fluorocarbon compounds, ammonium fluorocarboxylates and perfluorocarboxylic acids.

Turning first to the preferred quaternary ammonium cationic fluorocarbon surfactants of this invention, these can broadly be represented by the formula:

$$C_nF_{2n+1}CONHC_3H_6N(CH_3)_qC_rH_{2r+1}X$$

where $n$ is preferably from 6 to 9, $q$ is 2 or 3, and $r$ is 0 to 2. X represents any halide. Two specific examples of materials within the above class are:

$$C_7F_{15}CONHC_3H_6(CH_3)_2C_2H_5Cl; \text{ and}$$

$$\underbrace{C_7F_{15}CONH}_{R_f}\underbrace{C_3H_6N(CH_3)_3I}_{R_H}$$

The $R_f$ or fluorocarbon portion may be chosen to give the desired properties for effective surface treatment, i.e., the desired surface tension of the flux to optimize solder wetting properties.

When $n<5$, the surfactant may prove unsatisfactory due to high volatility or instability. In the case of $n>9$, the $R_f$ increase using an $R_H$ comparable to those above, would make solubility the determining factor. That is $n>9$ is acceptable, but the fluorocarbon must still be soluble in the flux components. Similarly, the acceptability of compounds where $n<5$ would depend upon the volatility or instability acceptable to the user.

Similar changes in the $R_H$ portion of the molecule would affect chemical, as well as physical, properties.

Tailor-made surfactants can thus be obtained through $R_f/R_H$ variations to gain the desired property effects.

The length of the quatenary ammonium cationic agent provides the desired water, oil, or alcohol solubility with the anion having an insignificant effect on properties. The formula for the cationic fluorocarbon surfactant used in the flux preparation of the examples is within the class specifically:

$$F(CF_2)_7CONHC_3H_6N(C_2H_5)_2CH_3I$$

A second group of preferred cationic fluorocarbon surfactants includes the C-9 and C-11 ammonium fluorocarboxylates having the general formula:

$$H(CF_2)_nCOONH_4$$

where $n=8$ or $10$.

Chemically, these compounds are ammonium salts of highly fluorinated alkanoic acids.

A third group of preferred cationic fluorocarbon surfactants useful in the present invention are the perfluorocarboxylic acids in which the carbon chain of the hydrophobic group is completely fluorinated except for one terminal hydrogen atom. These can be represented by the formula:

$$HCF_2(CF_2)_SCOOH$$

where S preferably is 5 to 8. The salts thereof, such as the metal salts, may also be used.

The use of a cationic fluorocarbon surfactant offers a unique combination of properties which cannot be duplicated by any other materials and which, in short, provides the art with advantages heretofore unexpected in the use of non-activated rosin fluxes.

Firstly, the use of a cationic fluorocarbon surfactant will lower the surface tension of the rosin flux, and provide better spreading and wetting of the rosin flux. The cationic fluorocarbon surfactants also illustrate excellent thermal and chemical stability at soldering conditions. Thus, fluorine, a highly corrosive atom, will not be freed from the surfactant during soldering which one might be led to expect. Accordingly, while halide groups (fluorine, chlorine, bromine, iodine), will be present, these will always be in the form of a compound, and not as free ions. There are no organic acids present or sulfonated long chain aliphatic alcohols as in the prior art.

Further, a flux incorporating the cationic fluorocarbon surfactants of the present invention greatly reduces the amount of cleaning required. While the reason for this is not completely understood, it is theorized that the molecules in the cationic fluorocarbon compound become oriented along interfacial boundaries to achieve surface activity effects at very low concentrations. This orientation is not a property of surfactant in general and thus the cationic fluorocarbon surfactant of this invention cannot be analogized to other surfactants. Rather, this surface activity effect is a very specific property of the cationic fluorocarbon surfactants.

As a further effect, when any heterogeneous flux mixture is used, control and stability are important factors to consider. Typically, at the elevated temperatures encountered during soldering, flux stability is adversely affected. For some reason, in the case of using a cationic fluorocarbon surfactant, highly stable systems are achieved, perhaps due to the uniform and homogeneous structure of these surface active agents.

It is appropriate to emphasize one particular feature of the use of the cationic fluorocarbon surfactants of the present invention further. Many soldering fluxes make the claim that no activators are present which would lead to corrosion. However, chemical analysis of such "corrosion-free" soldering fluxes proves that halides are, in fact, present. With the use of the cationic fluorocarbon surfactants of the present invention, it has definitely been proven by laboratory analysis that no free halides are present. This of course, is of the prime advantages of the present invention since halides will invariably lead to corrosion, thereby leading to early failure of electronic devices.

Generally, the rosin flux of the present invention can be used in any type of conventional soldering known to the art. Of course, the flux of the present invention further permits soldering to be conducted at a greater temperature range than the prior art, the present flux being operable over the most important commercial soldering range of 375° F. to about 600° F.

While the soldering flux of this invention finds particular application in the area of electronics for the soldering of copper plate, immersion tin, Tintillate tin-lead plate, gold and silver using any well known solder, these are non-restrictive materials and only provided as illustrative. Unless otherwise indicated, all percentages in this application are in percent by weight based on the total composition.

EXAMPLE 1

A non-activated soldering flux in accordance with the present invention having the following composition was formed:

| | Percent |
|---|---|
| Water white rosin | 37.99 |
| Isopropyl alcohol | 60 |
| Glycerin | 2 |
| Cationic fluorocarbon surfactant | [1] 0.01 |

[1] The surfactant used was FC-1.34 available from the 3M Corporation with the formula $$F(CF_2)_7CONHC_3N_6(C_2H_5)CHI$$

The above formulation was prepared in the following manner. Water-white rosin powder was added to the isopropyl alcohol and then the glycerine and surfactant were added. The composition was cold mixed at ambient temperature to ensure a homogeneous solution. The rosin was obtained in granular form and ground to a powder. Alternatively to the above, the rosin flux can be prepared at temperatures above ambient, but for some reason it has been discovered that a reduction in fluxing ability of the water-white rosin is encountered if temperatures above ambient are used. Thus, if one prepares a mix according to the warm mixed procedure by heating to a temperature of about 160° F., one encounters a reduction in the spreading area of the solder. The flux should thus be prepared by mixing the components at a temperature of 70 to 76° F. The above discovery, i.e., the superiority of a cold-mixed flux, is quite surprising in view of the teachings of the prior art.

The above non-activated soldering flux illustrated a solids content of 40%, a density of 0.902 at 780 F., and no free acidity.

It must be reiterated that although glycerine was present in the example, where flux removal is not desired or where soldering temperatures are lower than 500° F., or where visual appearance is of no importance or the assembly cannot be cleaned, the glycerine content can be lowered to zero. Accordingly, although when glycerine is present it is preferred to be about 2-3%, where the above conditions are present, no glycerine need be used.

Many uses have been heretofore described for the soldering flux of this invention. Of course, the flux of this invention provides results superior to those of the prior art, and provides a much broader range of use than the fluxes of the prior art.

Variations of the soldering flux formula in terms of solids content, quantity and type of organic solvent, etc. within the ranges provided insures application over the broadest range of environments. For instance, the flux finds application in touch-up areas where soldering irons often exceeds the specific 361° F. 63/37 SnPb temperatures as well as other SnPb alloy temperatures required to reflow solder fillets, especially in areas of printed circuits containing module leads or laminate interplanes. Advantages of using the flux of this invention for such a technique would be:

(1) improved heat transfer during soldering;
(2) improved wetting of the surfaces being soldered;
(3) increased fluxing range over other non-activated rosin fluxes; and
(4) ease of residue removal after soldering.

Cleaning is accomplished through the use of sprays or immersion rinsing in either Freon-isopropyl alcohol or chlorothene. Azeotropes containing both chlorothene as well as alcohol solvents has been used with success.

A liquid flux forms the most preferred embodiment of the present invention and provides results superior to other fluxes which are formulated. However, as iindicated, a paste flux can be formulated and, if for some activities a powder with fluxing activity is required, a powder in accordance with the present invention can be used. The protective coating embodiment would basically serve as a flux increasing spreading area during soldering.

While the invention has been particularly shown and described with reference to a preferred embodiment thereof, it will be understood by those skilled in the art that various changes in form and details may be made therein without departing from the spirit and scope of the invention.

What is claimed is:

1. A soldering flux comprising:
   20–65% rosin;
   0.01–1% of a cationic fluorocarbon surfactant, the balance being organic solvents, all percents being by weight.

2. The flux of claim 1 comprising:
   30–40% rosin;
   60–70% organic solvents; and
   0.1–1% of said surfactant.

3. The flux of claim 2 wherein said rosin is water white rosin.

4. The flux of claim 2 wherein said organic solvent comprises isopropyl alcohol.

5. The flux of claim 1 further comprising from 2–3% glycerine.

6. The flux of claim 1 wherein said surfactant is selected from the group consisting of polyfluoroquaternary ammonium surfactants, ammonium fluorocarboxylate surfactants and polyfluorocarboxylic acid surfactants.

7. The flux of claim 1 wherein said surfactant is a polyfluoroquaternary ammonium surfactant of the formula $$C_nF_{2n+1}CONHC_3H_6N(CH_3)_qC_rH_{2r+1}X$$

where $n$ is 6 to 9, $q$ is 2 or 3, $r$ is 0 to 2 and X is a halide.

8. The flux of claim 1 wherein said surfactant is an ammonium fluorocarboxylate surfactant of the formula $$H(CF_2)_nCOONH_4$$

where $n$ is 8 or 10.

9. The flux of claim 1 wherein said surfactant is a polyfluorocarboxylic acid surfactant or salt thereof of the formula $$HCF_2(CF_2)_sCOOM$$

where S is 5 to 8 and M is hydrogen, an ammonium ion or a metallic ion.

10. The flux of claim 1 wherein said surfactant is $$C_7F_{15}CONHC_3H_6N(CH_3)_3I$$

11. The flux of claim 1 wherein said surfactant is $$C_7F_{15}CONHC_3H_6N(CH_3)_2C_2H_5Cl$$

12. The flux of claim 1 wherein said surfactant is $$F(CF_2)_7CONHC_3H_6N(C_2H_5)_2CH_3I$$

13. The flux of claim 2 wherein said surfactant is selected from the group consisting of polyfluoroquaternary ammonium surfactants, ammonium fluorocarboxylate surfactants and polyfluorocarboxylic acid surfactants.

14. The flux of claim 2 wherein said surfactant is a polyfluoroquaternary ammonium surfactant of the formula $$C_nF_{2n+1}CONHC_3H_6N(CH_3)_qC_rH_{2r+1}X$$

where $n$ is 6 to 9, $q$ is 2 or 3, $r$ is 0 to 2 and X is a halide.

15. The flux of claim 2 wherein said surfactant is an ammonium fluorocarboxylate surfactant of the formula $$H(CF_2)_nCOONH_4$$

where $n$ is 8 or 10.

16. The flux of claim 2 wherein said surfactant is a polyfluorocarboxylic acid surfactant or salt thereof of the formula $$HCF_2(CF_2)_sCOOM$$

where S is 5 to 8 and M is hydrogen, an ammonium ion or a metallic ion.

17. The flux of claim 2 wherein said surfactant is $$C_7F_{15}CONHC_3H_6N(CH_3)_3I$$

18. The flux of claim 2 wherein said surfactant is $$C_7F_{15}CONHC_3H_6N(CH_3)_2C_2H_5Cl$$

19. The flux of claim 2 wherein said surfactant is $$F(CF_2)_7CONHC_3H_6N(C_2H_2)_5CH_3I$$

20. A soldering flux comprising:
    99 to 99.99% rosin and
    0.1 to 1% of a cationic fluorocarbon surfactant.

21. The flux of claim 20 wherein said surfactant is a polyfluoroquaternary ammonium surfactant of the formula $$C_nF_{2n+1}CONHC_3H_6N(CH_3)_qC_rH_{2r+1}X$$

where $n$ is 6 to 9, $q$ is 2 or 3, $r$ is 0 to 2 and X is a halide.

22. The flux of claim 20 wherein said surfactant is an ammonium fluorocarboxylate surfactant of the formula $$H(CF_2)_nCOONH_4$$

where $n$ is 8 or 10.

23. The flux of claim 20 wherein said surfactant is a polyfluorocarboxylic acid surfactant or salt thereof of the formula $$HCF_2(CF_2)_sCOOM$$

where S is 5 to 8 and M is hydrogen, an ammonium ion or a metallic ion.

24. The flux of claim 20 wherein said surfactant is $$C_7F_{15}CONHC_3H_6N(CH_3)_3I$$

25. The flux of claim 20 wherein said surfactant is $$C_7F_{15}CONHC_3H_6N(CH_3)_2C_2H_5Cl$$

26. The flux of claim 20 wherein said surfactant is $$F(CF_2)_7CONCH_3H_6N(C_2H_5)_2CH_3I$$

27. The flux of claim 1 wherein said solvents comprise at least 70 to 90% of a $C_1$ to $C_3$ primary alcohol, and mixtures thereof, on a total solvent weight basis.

(References on following page)

References Cited

UNITED STATES PATENTS

| | | | |
|---|---|---|---|
| 2,664,370 | 12/1953 | Snell et al. | 148—23 |
| 2,700,628 | 1/1955 | De Rosa et al. | 148—23 |
| 2,715,084 | 8/1955 | König | 148—23 |
| 2,898,255 | 8/1959 | Thompson et al. | 148—23 |
| 3,003,901 | 10/1961 | Marcell | 148—23 |
| 3,305,406 | 2/1967 | Chmelik et al. | 148—23 |
| 2,805,970 | 9/1957 | McBride | 148—23 |
| 2,901,387 | 8/1959 | Forker et al. | 148—23 |

FOREIGN PATENTS

| | | | |
|---|---|---|---|
| 12,111 | 8/1962 | Japan | 148—23 |
| 18,328 | 10/1966 | Japan | 148—23 |

HELEN M. S. SNEED, Primary Examiner

U.S. Cl. X.R.

29—495; 148—25